United States Patent
Shinohara et al.

(10) Patent No.: US 12,465,714 B2
(45) Date of Patent: Nov. 11, 2025

(54) OXYGEN CONCENTRATOR, CONTROL METHOD, AND CONTROL PROGRAM

(71) Applicant: Teijin Pharma Limited, Tokyo (JP)

(72) Inventors: Koichi Shinohara, Tokyo (JP); Yuki Yamaura, Tokyo (JP)

(73) Assignee: Teijin Pharma Limited, Tokyo (JP)

(*) Notice: Subject to any disclaimer, the term of this patent is extended or adjusted under 35 U.S.C. 154(b) by 872 days.

(21) Appl. No.: 17/293,967

(22) PCT Filed: Nov. 14, 2019

(86) PCT No.: PCT/JP2019/044758
§ 371 (c)(1),
(2) Date: May 14, 2021

(87) PCT Pub. No.: WO2020/100996
PCT Pub. Date: May 22, 2020

(65) Prior Publication Data
US 2022/0001130 A1  Jan. 6, 2022

(30) Foreign Application Priority Data
Nov. 15, 2018 (JP) .................................. 2018-215091

(51) Int. Cl.
A61M 16/10 (2006.01)
A61M 16/00 (2006.01)
(Continued)

(52) U.S. Cl.
CPC ...... A61M 16/101 (2014.02); A61M 16/0003 (2014.02); A61M 16/107 (2014.02);
(Continued)

(58) Field of Classification Search
CPC ............ A61M 16/101; A61M 16/0003; A61M 16/107; A61M 16/208; A61M 16/1045;
(Continued)

(56) References Cited

U.S. PATENT DOCUMENTS 6,270,556 B1   8/2001  Rouge et al.
6,896,721 B1 * 5/2005  Lynn .................. B01D 53/0473
                                                       96/116
(Continued)

FOREIGN PATENT DOCUMENTS

CN   101678189 A   3/2010
CN   102458550 A   5/2012
(Continued)

OTHER PUBLICATIONS

International Search Report, dated Feb. 4, 2020, issued by the International Searching Authority in International Application No. PCT/JP2019/044758.
(Continued)

*Primary Examiner* — Tu A Vo
*Assistant Examiner* — Kelsey E Baller
(74) *Attorney, Agent, or Firm* — Sughrue Mion, PLLC (57) ABSTRACT

Provided is an oxygen concentration device, a control method, and a control program with which a start-up interval until a desired high-concentration oxygen gas can be supplied can be reduced. The oxygen concentration device includes a pressurized air supply unit for supplying pressurized air, an adsorption tube which concentrates oxygen in the pressurized air by adsorbing nitrogen in the supplied pressurized air to generate oxygen gas, an oxygen gas tank for storing oxygen gas, a flow rate adjustment unit which adjusts an oxygen gas flow rate to be output to the exterior from the oxygen gas tank, and a control unit which controls the flow rate adjustment unit so that the oxygen gas flow rate becomes a set flow rate and controls the pressurized air supply unit so that the pressurized air achieves a supply amount corresponding to the set flow rate.

6 Claims, 6 Drawing Sheets

(51) Int. Cl.
*A61M 16/20* (2006.01)
*B01D 53/04* (2006.01)

(52) U.S. Cl.
CPC ........... *A61M 16/208* (2013.01); *B01D 53/04* (2013.01); *A61M 2016/003* (2013.01); *A61M 16/1045* (2013.01); *A61M 2205/3334* (2013.01); *B01D 2257/102* (2013.01)

(58) Field of Classification Search
CPC .... A61M 2016/003; A61M 2205/3334; A61M 2205/52; A61M 2205/3341; A61M 2205/502; A61M 16/022; A61M 16/16; A61M 2016/102; A61M 2016/1025; B01D 2258/06; B01D 53/04; B01D 53/30; B01D 53/053; B01D 53/047; B01D 53/0454; B01D 53/0423; B01D 2257/102; B01D 2253/108; B01D 2259/4533; B01D 2256/12
See application file for complete search history.

(56) References Cited

U.S. PATENT DOCUMENTS

| | | | | |
|---|---|---|---|---|
| 2002/0038657 | A1* | 4/2002 | Yagi | A61M 16/00 128/204.23 |
| 2003/0167924 | A1* | 9/2003 | McCombs | B01D 53/053 96/111 |
| 2006/0230929 | A1* | 10/2006 | Bliss | B01D 53/0407 95/96 |
| 2007/0039466 | A1* | 2/2007 | Nawata | G01N 29/024 95/96 |
| 2009/0255403 | A1* | 10/2009 | Uchiyama | C01B 13/0259 96/2 |
| 2010/0071698 | A1 | 3/2010 | Kiritake | |
| 2010/0242734 | A1* | 9/2010 | Maeda | C01B 13/0259 96/110 |
| 2017/0113013 | A1* | 4/2017 | Allum | B01D 53/0446 |

FOREIGN PATENT DOCUMENTS

| | | | |
|---|---|---|---|
| EP | 1000652 | A1 | 5/2000 |
| FR | 2727023 | B1 | 12/1996 |
| JP | 64-43328 | A | 2/1989 |
| JP | 6-31129 | A | 2/1994 |
| JP | 11-207128 | A | 8/1999 |
| JP | 2001-259341 | A | 9/2001 |
| JP | 2002-79030 | A | 3/2002 |
| JP | 2006-15221 | A | 1/2006 |
| JP | 2009119323 | A * | 6/2009 |
| JP | 2012228415 | A * | 11/2012 |
| WO | 2008/035817 | A1 | 3/2008 |

OTHER PUBLICATIONS

Written Opinion, dated Feb. 4, 2020, issued by the International Bureau in International Application No. PCT/JP2019/044758.

Office Action, dated Mar. 21, 2022, issued by the Indian Patent Office in Indian Application No. 202117025174.

* cited by examiner

OXYGEN CONCENTRATOR, CONTROL METHOD, AND CONTROL PROGRAM

CROSS REFERENCE TO RELATED APPLICATIONS

This application is a National Stage of International Application No. PCT/JP2019/044758, filed Nov. 14, 2019, claiming priority to Japanese Patent Application No. 2018-215091, filed Nov. 15, 2018.

FIELD

The present disclosure relates to an oxygen concentration device, a control method, and a control program.

BACKGROUND

Conventionally, as a therapy for patients with respiratory diseases such as asthma and obstructive chronic lung disease, oxygen therapy, which is a therapy in which oxygen gas or concentrated oxygen gas is inhaled by the patient, has been performed. In recent years, in order to improve the QOL (Quality of Life) of patients, home oxygen therapy (HOT), in which oxygen therapy is performed at the home of the patient, has become mainstream. In home oxygen therapy, an oxygen concentration device is used as an oxygen supply source for supplying oxygen gas to the patient by concentrating oxygen contained in air to generate oxygen gas and supplying the generated oxygen gas.

Pressure swing adsorption-type (hereinafter PSA-type) oxygen concentration devices, VPSA (Vacuum Pressure Swing Adsorption) type, and VSA (Vacuum Swing Adsorption) type oxygen concentration devices have been widely adopted as oxygen concentration devices.

Oxygen concentration devices have a pair of adsorption tubes filled with an adsorbent which selectively adsorbs nitrogen gas, and each of the pair of adsorption tubes generates oxygen gas by repeating an adsorption process and a desorption process, and the generated oxygen gas is stored in an oxygen gas tank. The adsorption process is a process in which the nitrogen gas in the pressurized air drawn into the adsorption tube is adsorbed by the adsorbent to generate oxygen gas from the pressurized air, and the generated oxygen gas is stored in the oxygen gas tank. The desorption process is a process in which the interior of the adsorption tube is opened to the atmosphere, and the nitrogen gas adsorbed onto adsorbent in the adsorption process is released into the atmosphere. The oxygen concentration device can continuously generate oxygen gas by alternately repeating the adsorption process and the desorption process between the pair of adsorption tubes.

In the oxygen concentration device, for example, when sufficient oxygen gas is not stored in the oxygen gas tank, oxygen gas may not be stably supplied at the flow rate to be administered to the patient. Since the patient may urgently need oxygen gas at the desired flow rate, depending on the medical condition of the patient, it is desirable that the start-up interval, which is the interval from the start-up of the oxygen concentration device to the stable supply of oxygen gas at the desired flow rate to the patient, be as short as possible.

JIS T7209: 2018, "Medical Electrical Equipment—Individual requirements for basic safety and basic performance of oxygen concentration devices", describes, as "201.12.4.4.101.2 Start-Up Interval Display", that "The oxygen concentration device shall be equipped with an alarm system with a low priority device alarm state to indicate when the oxygen concentration in the generated gas does not reach the minimum rated concentration during the start-up interval. This alarm state does not need to be activated if the start-up interval is less than 120 seconds." In order for the oxygen concentration device to satisfy the requirements prescribed by JIS T7209: 2018, it is desirable to reduce the time until the oxygen concentration reaches the predetermined minimum rated concentration as much as possible.

Patent Literature 1 describes an oxygen concentration device which reduces the time required for the concentration of oxygen gas supplied to the patient to reach the desired concentration by fully opening a flow rate control valve, which sets the flow rate of oxygen gas to be supplied to the patient, at the time of starting.

Patent Literature 2 describes an oxygen concentration device, wherein after maximizing the rotation speed of a compressor which supplies pressurized air to an adsorption tube at start-up, the concentration of oxygen gas supplied to the patient is maintained by gradually reducing the compressor speed in accordance with the flow rate of the oxygen gas to be supplied to the patient.

CITATION LIST

Patent Literature

[PTL 1] Japanese Unexamined Patent Publication (Kokai) No. 2009-119323
[PTL 2] Japanese Unexamined Patent Publication (Kokai) No. 11-207128

SUMMARY

Though the oxygen concentration devices described in Patent Literature 1 and 2 can reduce the time for the concentration of oxygen gas to be supplied to the patient to reach a desired concentration, there is a need for a technology which further reduces the time necessary for the concentration of oxygen gas to be supplied to the patient to reach the desired concentration.

The object of the oxygen concentration device, the control method, and the control program is to reduce the start-up interval until oxygen gas at the flow rate to be administered to the patient can be supplied.

An oxygen concentration device according to an aspect of an embodiment comprises a pressurized air supply unit for supplying pressurized air, an adsorption tube to which pressurized air is supplied from the pressurized air supply unit and which concentrates oxygen in the pressurized air by adsorbing nitrogen in the supplied pressurized air to generate oxygen gas, an oxygen gas tank for storing oxygen gas generated by the adsorption tube, a flow rate adjustment unit which adjusts an oxygen gas flow rate, which is a flow rate of the oxygen gas to be output to the exterior from the oxygen gas tank, and a control unit which controls the flow rate adjustment unit so that the oxygen gas flow rate becomes a set flow rate and controls the pressurized air supply unit so that the pressurized air achieves a supply amount corresponding to the set flow rate, wherein the control unit, only in a start-up interval of the oxygen concentration device, controls the flow rate adjustment unit so that the oxygen gas flow rate becomes a start-up flow rate which is equal to or greater than each of the set flow rates, and controls the pressurized air supply unit so that the pressurized air achieves a start-up supply amount equal to or greater than a set supply amount, which is the supply amount corresponding to each of the set flow rates.

In the oxygen concentration device according to an aspect of the embodiment, it is preferable that the start-up supply amount be a supply amount corresponding to a maximum set flow rate of the pressurized air supply unit, and the start-up flow rate be a maximum set flow rate of the flow rate adjustment unit.

In the oxygen concentration device according to an aspect of the embodiment, it is preferable that the start-up supply amount be a maximum supply amount which can be supplied by the pressurized air supply unit, and the start-up flow rate be a maximum flow rate which can be supplied by the flow rate adjustment unit.

The oxygen concentration device according to an aspect of the embodiment preferably further comprises an end of start-up process determination unit for determining an end of start-up process in accordance with whether or not a predetermined start-up interval has elapsed or whether or not a predetermined oxygen concentration has been reached.

The oxygen concentration device according to an aspect of the embodiment preferably further comprises a check valve connected between the adsorption tube and the oxygen gas tank.

A control method according to an aspect of an embodiment is for an oxygen concentration device for controlling so that an oxygen gas flow rate becomes a set flow rate, the method comprising the steps of acquiring a process start-up signal indicating that an oxygen gas generation process for generating oxygen gas has started, outputting, to a pressurized air supply unit, a start-up supply amount supply signal indicating that a start-up supply amount equal to or greater than a set supply amount, which is a supply amount corresponding to the set flow rate, is to be supplied, and outputting, to a flow rate adjustment unit, a start-up flow rate output signal indicating that a start-up flow rate equal to or greater than the set flow rate, is to be output, determining an end of a start-up process in accordance with whether or not a predetermined start-up interval has elapsed or whether or not a predetermined oxygen concentration has been reached, and when it is determined that the start-up process has ended, outputting, to the pressurized air supply unit, a set supply amount supply signal indicating that the set supply amount is to be supplied, and outputting, to the flow rate adjustment unit, a set flow rate output signal indicating that the set flow rate is to be output.

A control program according to an aspect of an embodiment is for an oxygen concentration device for controlling so that a flow rate of oxygen gas to be output becomes a set flow rate, the control program executing, by means of a processor, processes comprising acquiring a process start-up signal indicating that an oxygen gas generation process for generating oxygen gas has started, outputting, to a pressurized air supply unit, a start-up supply amount supply signal indicating that a start-up supply amount equal to or greater than a set supply amount, which is a supply amount corresponding to the set flow rate, is to be supplied, and outputting, to a flow rate adjustment unit, a start-up flow rate output signal indicating that a start-up flow rate equal to or greater than the set flow rate, is to be output, determining an end of a start-up process in accordance with whether or not a predetermined start-up interval has elapsed or whether or not a predetermined oxygen concentration has been reached, and when it is determined that the start-up process has ended, outputting, to the pressurized air supply unit, a set supply amount supply signal indicating that the set supply amount is to be supplied, and outputting, to the flow rate adjustment unit, a set flow rate output signal indicating that the set flow rate is to be output.

According to the present embodiment, the oxygen concentration device, the control method, and the control program can reduce the start-up interval until oxygen gas at the flow rate to be administered to the patient can be supplied.

The object and effects of the present invention can be recognized and obtained specifically by using the components and combinations indicated in the claims. Both the general description described above and the detailed description below are exemplary and descriptive and do not limit the invention described in the claims.

DESCRIPTION OF EMBODIMENTS

The oxygen concentration device, control method, and control program according to an aspect of the present disclosure will be described below while referring to the drawings. However, it should be noted that the technical scope of the present disclosure is not limited to the embodiments, but extends to the inventions described in the claims and their equivalents. In the following description and drawings, components having the same functional configuration are designated by the same reference signs, and duplicate descriptions thereof have been omitted.

Summary of Oxygen Concentration Device According to Embodiment

Figure 1:
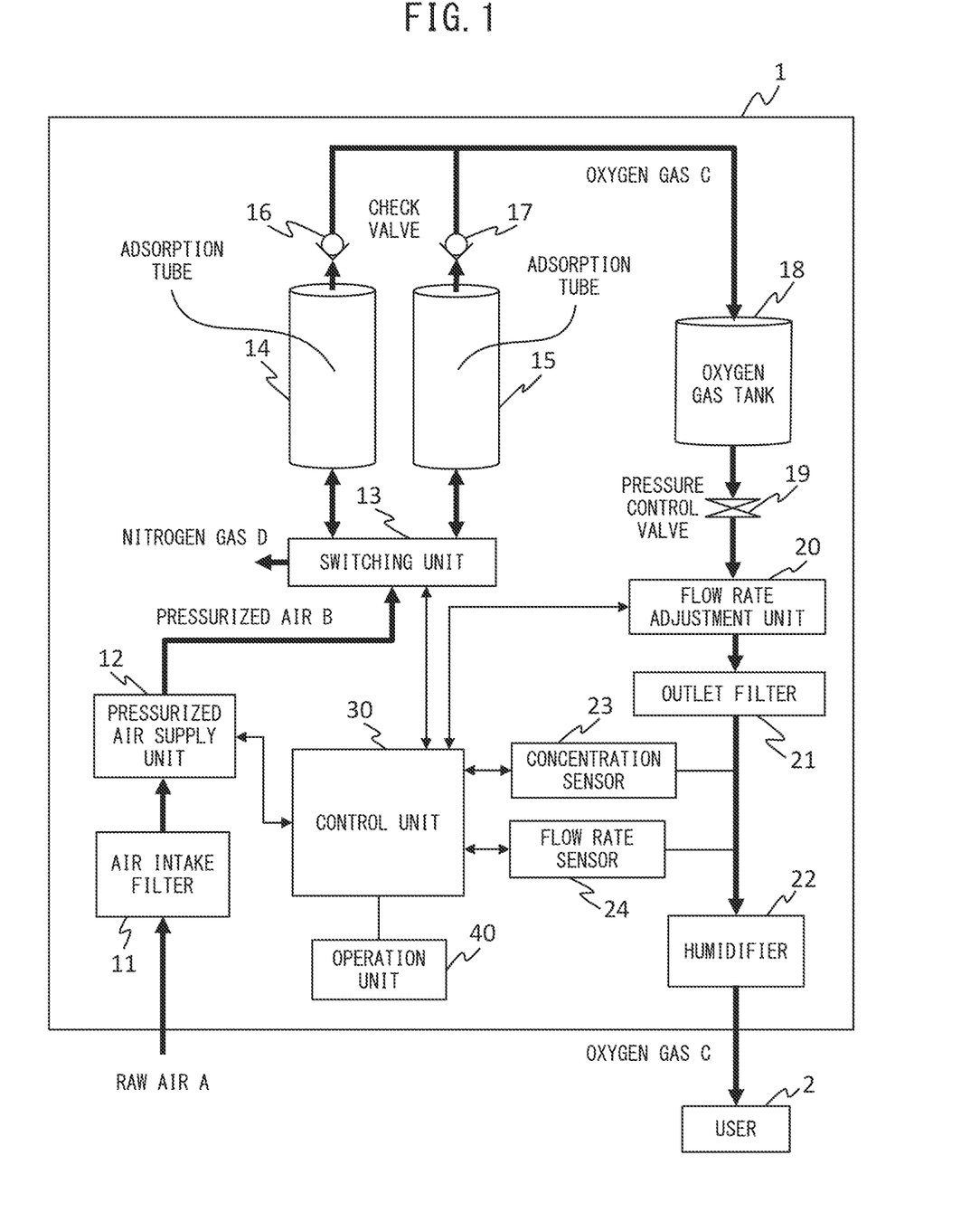
FIG. 1 is a functional block diagram of an oxygen concentration device according to an embodiment.

FIG. 1 is a functional block diagram of an oxygen concentration device according to an embodiment.

The oxygen concentration device 1 comprises an air intake filter 11, a pressurized air supply unit 12, a switching unit 13, a pair of adsorption tubes 14 and 15, a pair of check valves 16 and 17, and an oxygen gas tank 18. The oxygen concentration device 1 further comprises a pressure control valve 19, a flow rate adjustment unit 20, an outlet filter 21, a humidifier 22, a concentration sensor 23, a flow rate sensor 24, a control unit 30, and an operation unit 40. The oxygen concentration device 1 performs an oxygen gas generation process in which oxygen gas C is generated from raw air A, and the generated oxygen gas C is output to the nostrils of a user 2, who is a patient using the oxygen concentration device 1.

The air intake filter 11 is an air filter which removes foreign substances such as dust contained in the raw air A drawn from the exterior of the oxygen concentration device 1. The pressurized air supply unit 12 is, for example, an oscillating air compressor or a rotary air compressor such as a screw, rotary, or scroll air compressor. The pressurized air supply unit 12 compresses the air A drawn through the air intake filter 11 to generate pressurized air B, and supplies the generated pressurized air B to either one of the pair of adsorption tubes 14 and 15 via the switching unit 13.

The switching unit 13 comprises, for example, three two-way valve manifolds composed of solenoid valves and piping. The switching unit 13 switches the supply path of the pressurized air B supplied to the pair of adsorption tubes 14 and 15 and the discharge path of nitrogen gas D discharged from the pair of adsorption tubes 14 and 15 in accordance with a control signal input from the control unit 30.

The switching unit 13 forms a discharge path for discharging the nitrogen gas D from the adsorption tube 15 to the exterior of the oxygen concentration device 1 when a supply path for supplying pressurized air B is formed between the air intake filter 11 and the adsorption tube 14. Furthermore, the switching unit 13 forms a discharge path for discharging the nitrogen gas D from the adsorption tube 14 to the exterior of the oxygen concentration device 1 when a supply path for supplying the pressurized air B is formed between the air intake filter 11 and the adsorption tube 15.

The pair of adsorption tubes 14 and 15 are filled with zeolite as an adsorbent which selectively adsorbs the nitrogen gas D rather than the oxygen gas C in the pressurized air B. Since zeolite selectively adsorbs approximately 77% of the nitrogen gas D contained in the pressurized air supplied from the pressurized air supply unit 12 via the switching unit 13 and adsorbs water vapor, the oxygen gas C generated by the pair of adsorption tubes 14 and 15 becomes dry.

The pair of adsorption tubes 14 and 15 adsorb the nitrogen gas D from the pressurized air B supplied from the pressurized air supply unit 12 via the switching unit 13 to generate the oxygen gas C. While the adsorption tube 14 generates the oxygen gas C, the adsorption tube 15 discharges the adsorbed nitrogen gas D to the exterior of the oxygen concentration device 1 via the switching unit 13. The adsorption tube 15 generates the oxygen gas C while the adsorption tube 14 discharges the adsorbed nitrogen gas D to the exterior of the oxygen concentration device 1 via the switching unit 13. The pair of adsorption tubes 14 and 15 alternately generate oxygen gas C, whereby the oxygen concentration device 1 can continuously generate oxygen gas C. Note that though the oxygen concentration device 1 comprises the pair of adsorption tubes 14 and 15, the oxygen concentration devices according to other embodiments may comprise three or more adsorption tubes.

The pair of check valves 16 and 17 are arranged between the pair of adsorption tubes 14 and 15, respectively, and the oxygen gas tank 18. The check valve 16 is open while the adsorption tube 14 generates the oxygen gas C, and the oxygen gas C generated by the adsorption tube 14 flows into the oxygen gas tank 18. Furthermore, the check valve 16 is closed while the adsorption tube 14 discharges the adsorbed nitrogen gas D to the exterior of the oxygen concentration device 1 via the switching unit 13, which prevents the oxygen gas stored in the oxygen gas tank 18 from being discharged to the exterior of the oxygen concentration device 1 via the adsorption tube 14.

The check valve 17 is open while the adsorption tube 15 generates the oxygen gas C, and the oxygen gas C generated by the adsorption tube 15 flows into the oxygen gas tank 18. Furthermore, the check valve 17 is closed while the adsorption tube 15 discharges the adsorbed nitrogen gas D to the exterior of the oxygen concentration device 1 via the switching unit 13, which prevents the oxygen gas C stored in the oxygen gas tank 18 from being discharged to the exterior of the oxygen concentration device 1 via the adsorption tube 15.

The oxygen gas tank 18, which is also referred to as a product tank, stores the oxygen gas generated in each of the pair of adsorption tubes 14 and 15. The internal pressure of the oxygen gas tank 18 fluctuates in accordance with changes in the internal pressures of the adsorption tubes 14 and 15 accompanying the generation of oxygen gas C. The pressure control valve 19 is, for example, a pressure reducing valve, which maintains the pressure of the oxygen gas output from the oxygen gas tank 18, which has an internal pressure which fluctuates in accordance with the generation of the oxygen gas C, at a predetermined pressure.

The flow rate adjustment unit 20 is, for example, a solenoid valve, and the opening thereof is adjusted in accordance with a flow rate output signal input from the control unit 30 to adjust the flow rate of the oxygen gas C output from the oxygen gas tank 18.

The outlet filter 21 is an air filter which removes foreign substances such as dust contained in the oxygen gas C generated in the oxygen gas generation process. Since the oxygen gas C generated by the adsorption tubes 14 and 15 is dry, the humidifier 22 supplies an appropriately humidified oxygen gas C in order to prevent the nostrils or respiratory tract of the user 2 from drying. The humidifier 22 is, for example, a bubbling or surface evaporation water humidifier.

The concentration sensor 23 and the flow rate sensor 24 are connected to the flow path of the oxygen gas C between the outlet filter 21 and the humidifier 22. The concentration sensor 23 is for measuring the concentration of the oxygen gas C, and is, for example, a zirconia, galvanic cell, or ultrasonic oxygen concentration sensor. Further, the flow rate sensor 24 is for measuring the flow rate of the oxygen gas C, and is, for example, a rotor meter or ultrasonic flow rate sensor.

Concentration data and flow rate data acquired by the concentration sensor 23 and the flow rate sensor 24 are transmitted to the control unit 30. The control unit 30 analyzes the data and controls the pressurized air supply unit 12, the switching unit 13, and the flow rate adjustment unit 20 so that the quality of the oxygen gas C supplied to the user 2 is maintained. Thus, the control unit 30 is communicably connected to the pressurized air supply unit 12, the switching unit 13, and the flow rate adjustment unit 20. The control unit 30 may be communicably connected to other components of the oxygen concentration device 1, for example, the humidifier 22, and may control the humidification by the humidifier 22.

The oxygen concentration device 1 comprises the operation unit 40, which is used for turning the power thereof on and off, setting the flow rate of the oxygen gas C supplied to the user 2, etc. The operation unit 40 is an interface unit having an image display unit and an input unit such as an LCD panel and an operation button or a touch panel, and is connected to the control unit 30.

[Control Unit]

Figure 2:
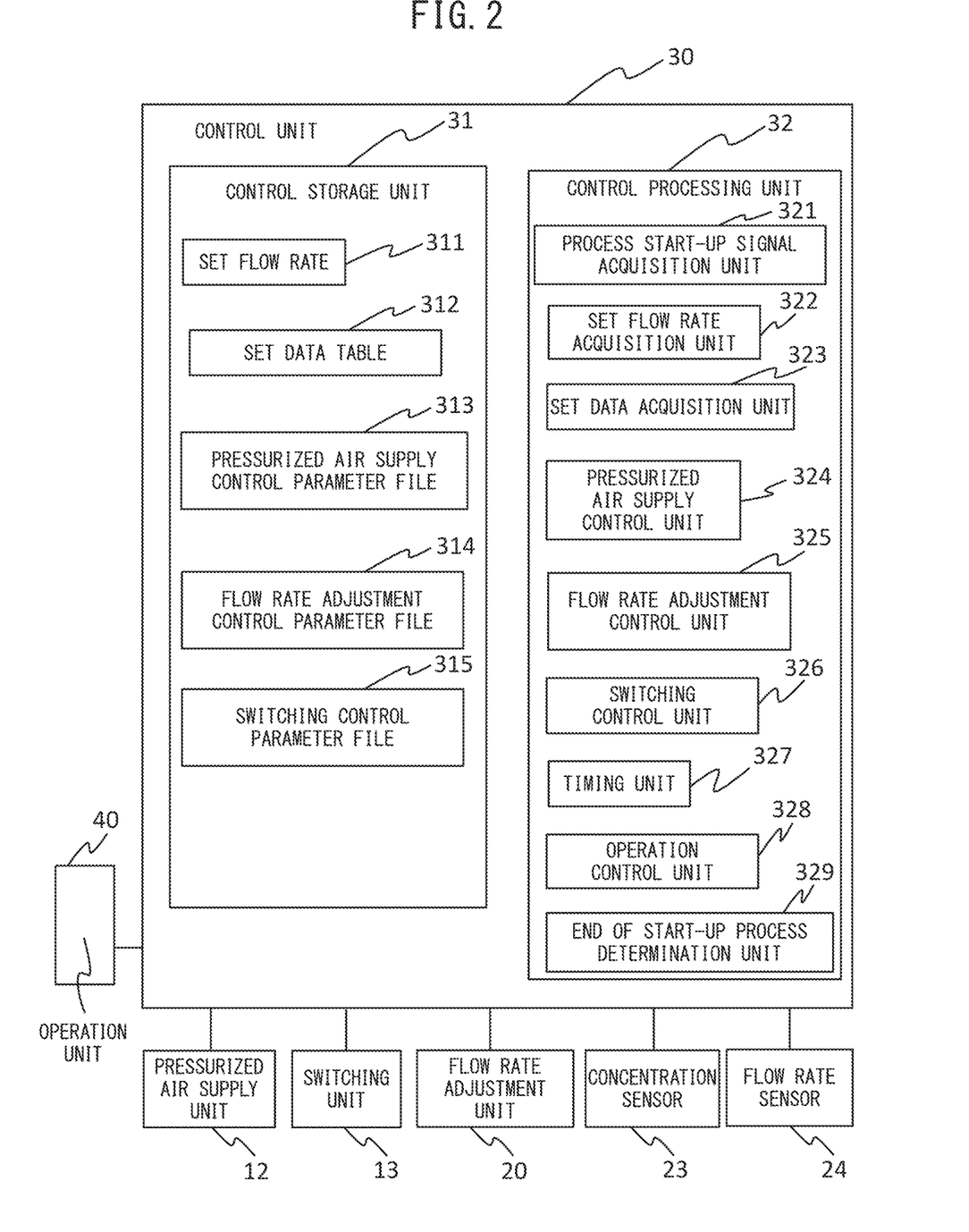
FIG. 2 is a view showing an example of blocks of the control unit shown in FIG. 1.

FIG. 2 is a block diagram of the control unit 30.

The control unit 30 comprises a control storage unit 31 and a control processing unit 32. The control storage unit 31 is composed of one or a plurality of semiconductor memories. For example, it may comprise at least one of RAM, flash memory, EPROM, EEPROM, and other non-volatile memories. The control storage unit 31 stores driver programs, operating system programs, application programs, data, etc., used for processing by the control processing unit 32.

The application programs stored in the control storage unit 31 include various programs for executing the oxygen gas generation process which generates the oxygen gas C and outputs the generated oxygen gas to the nostrils of the user 2. For example, the application programs include a pressurized air supply amount processing program, a switching control program, an oxygen gas flow rate adjustment program, and a start-up control program.

The pressurized air supply amount processing program is a program which causes the control processing unit 32 to execute a pressurized air supply amount control process for controlling the pressurized air supply amount of the pressurized air supply unit 12. The switching control program is a program which causes the control processing unit 32 to execute a switching control process for controlling the switching time of each of the pair of adsorption tubes 14 and 15 by the switching unit 13. The oxygen gas flow rate adjustment program is a program which causes the control processing unit 32 to execute a flow rate adjustment control process for controlling the flow rate adjustment unit 20 so as to adjust the flow rate of the oxygen gas C. The start-up control program is a program which causes the control processing unit 32 to execute a start-up control process for starting the oxygen concentration device.

Furthermore, the control storage unit 31 stores device driver programs which control the concentration sensor 23, etc., as driver programs. These computer programs may be installed in the control storage unit 31 from a portable computer-readable recording medium such as a CD-ROM or a DVD-ROM using a known setup program or the like. Alternatively, they may be downloaded from a program server or the like and installed.

The control storage unit 31 may temporarily store temporary data related to the predetermined processes. The control storage unit 31 stores a set flow rate 311, a set data table 312, a pressurized air supply control parameter file 313, a flow rate adjustment control parameter file 314, a switching control parameter file 315, etc. The set flow rate 311 is the flow rate of the oxygen gas C to be supplied to the user 2, and is set in accordance with a prescription of a physician.

The set data table 312 stores set data including a start-up supply amount, a start-up flow rate, a set supply amount, a start-up interval, and an oxygen concentration at start-up in association with the set flow rate. Though the set data table 312 differs in accordance with the model of the oxygen concentration device 1, the start-up supply amount, start-up flow rate, set supply amount, start-up interval, and start-up oxygen concentration are stored in association with a set flow rate such as "0.25 LPM", "1.00 LPM", "3.00 LPM", or "5.00 LPM." LPM is an abbreviation of liter per minute, and is expressed in liters of the supply amount of pressurized air and the flow rate of oxygen gas per minute.

As used herein, a low flow rate is defined as a range in which the flow rate of the oxygen gas is 0.25 LPM to less than 2.00 LPM, and a high flow rate is defined as a range in which the flow rate of the oxygen gas is 2.00 LPM to 5.00 LPM.

In the set data table 312, "set flow rate" indicates the flow rate of oxygen to be supplied to the user 2 in accordance with the prescription of a physician, and "start-up supply amount" indicates the supply amount of pressurized air at the time of start-up of the oxygen concentration device 1. The "start-up supply amount" is a supply amount equal to or greater than the "set supply amount", which is the supply amount corresponding to the "set flow rate", and is, for example, the maximum set supply amount that can be set by the oxygen concentration device 1. The "start-up flow rate" indicates the flow rate of oxygen at the time of start-up of the oxygen concentration device, and is a flow rate equal to or greater than the "set flow rate", for example, the maximum set flow rate that can be set for the oxygen concentration device 1. Furthermore, the "set supply amount" indicates the supply amount of pressurized air in accordance with the set flow rate, and the "start-up interval" indicates the interval from start-up until the supply amount of the pressurized air is switched from the start-up supply amount to the set supply amount and the oxygen flow rate is switched from the start-up flow rate to the set flow rate. The "start-up oxygen concentration" is, for example, the minimum rated concentration required by JIS T7209:2018.

The oxygen concentration device 1 can set the oxygen flow rate to any flow rate between 0.25 LPM and 5.00 LPM in accordance with the prescription of a physician or the like. The set data table 312 stores a start-up supply amount of pressurized air, a start-up flow rate of the oxygen gas C, a start-up interval, and the oxygen concentration at the time of start-up corresponding to each set flow rate. In the case of the maximum set flow rate that can be set for oxygen concentration device 1 of 5.00 LPM, though it differs in accordance with the oxygen concentration processing capacity of oxygen concentration device 1, for example, the start-up supply amount is the same as the maximum set supply amount corresponding to the maximum set flow rate which can be set. Furthermore, the start-up flow rate is 5.00 LPM, which is the same as the maximum set flow rate which can be set, and the start-up interval is, for example, less than 120 seconds. The start-up interval is related to the rise time of oxygen concentration and may be, for example, less than 110 seconds. The oxygen concentration at start-up is the minimum rated concentration required by JIS T7209:2018, and though the required concentration differs depending on the standard, for example, the specification of the standard oxygen concentration device is 90−3/+6 [vol %], and in that case, the minimum rated concentration is 87 vol %. In addition, there are models with specifications of 91−3/+5 [vol %], and the minimum rated concentration in that case is 88%.

When the set flow rate is a low flow rate of 0.25 LPM, though it differs in accordance with the oxygen concentration processing capacity of the oxygen concentration device 1, for example, if the maximum set flow rate (maximum flow rate) of oxygen concentration device 1 is 5.00 LPM, the start-up supply amount is the same as the start-up supply amount corresponding to the maximum set flow rate of oxygen concentration device 1 of 5.00 LPM (maximum supply amount). The start-up flow rate is the maximum set flow rate of the oxygen concentration device 1 of 5.00 LPM. The set supply amount is the minimum value corresponding to the minimum value of 0.25 LPM of the set flow rate, and the start-up interval is, for example, less than 120 seconds. The start-up interval is related to the rise time of oxygen concentration and may be, for example, less than 110 seconds.

When the pressurized air supply unit 12 is capable of supplying pressurized air in an amount equal to or greater than the start-up supply amount corresponding to the maximum set flow rate of the oxygen concentration device 1, the start-up supply amount can be set to be equal to or greater than the supply amount corresponding to the maximum set flow rate of the oxygen concentration device 1. Furthermore, the start-up flow rate can also be set to equal to or greater than the maximum set flow rate that can be set. The oxygen concentration device 1 can realize a faster oxygen concentration rise. Thus, the start-up interval can be, for example, less than 100 seconds.

The pressurized air supply control parameter file 313 stores parameters such as the rotation speed of the motor used when the control processing unit 32 executes the pressurized air supply amount control process. The flow rate adjustment control parameter file 314 stores parameters such as adjustment of the opening of the solenoid valves used when the control processing unit 32 executes the flow rate adjustment control process. The switching control parameter file 315 stores parameters such as the switching timing of the solenoid valves used when the control processing unit 32 executes the switching control process.

The control processing unit 32 comprises one or more processors and peripheral circuits thereof. The control processing unit 32 controls the overall operation of the oxygen concentration device 1 in an integrated manner, and is, for example, a processor such as an MCU (Micro Control Unit).

The control processing unit 32 executes processing based on the programs (operating system programs, driver programs, application programs, etc.) stored in the control storage unit 31. Furthermore, the control processing unit 32 may execute a plurality of programs (application programs and the like) in parallel. The control processing unit 32 comprises a process start-up signal acquisition unit 321, a set flow rate acquisition unit 322, a set data acquisition unit 323, a pressurized air supply control unit 324, a flow rate adjustment control unit 325, a switching control unit 326, a timing unit 327, an operation control unit 328, an end of start-up process determination unit 329, etc.

Each of these units of the control processing unit 32 may be implemented in the control unit 30 as an independent integrated circuit, circuit module, microprocessor, or firmware.

[Operation Panel]

Figure 3:
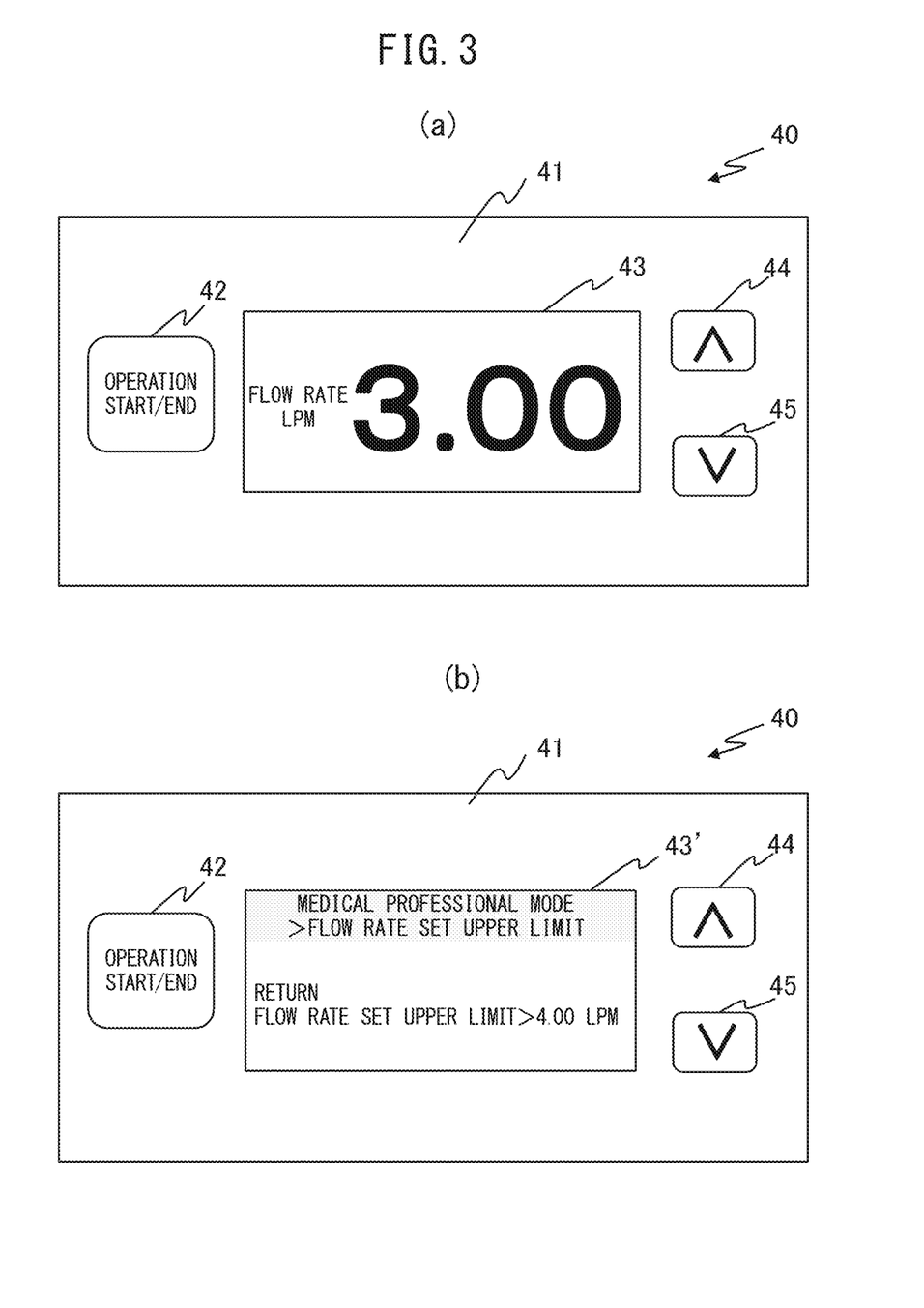
FIG. 3 is a view showing an example of a control panel, which is a constituent element of an operation unit 40, (a) shows the state of a patient-use operation panel, and (b) shows the state of an operation panel for special operations by medical professionals, etc.

FIG. 3 is a view showing an example of an operation panel, which is a constituent element of the operation unit 40. FIG. 3(a) is a view showing the state of a patient-use operation panel, and FIG. 3(b) is a view showing the state of an operation panel for special operations by medical professionals, etc.

The operation panel 41 is a user interface for the user 2 to operate the oxygen concentration device 1. An operation button 42 used for turning on/off the power of the oxygen concentration device 1 and starting and ending the oxygen gas generation process for generating the oxygen gas C is provided on the left side of the operation panel 41. A liquid crystal display unit 43 for displaying the set flow rate of the oxygen gas is provided in the center of the operation panel 41. The displayed set flow rate value is the flow rate value corresponding to the set flow rate 311 stored in the control storage unit 31. An up button 44 and a down button 45 for changing the flow rate setting are provided on the right side of the operation panel 41.

When the operation button 42 is pressed, the oxygen concentration device 1 is powered on and the oxygen gas generation process which generates the oxygen gas C is started. When the operation button is pressed again, the oxygen concentration device 1 ends the oxygen gas generation process which generates the oxygen gas C, and the power is turned off. The oxygen concentration device 1 may be put into hibernation mode by being plugged into a power outlet. The hibernation mode is also referred to as a standby mode, and is, for example, a state in which auxiliary processes such as a timer function and a display function are operated, but the oxygen gas generation process which generates the oxygen gas C, which is the primary function, is in a hibernation state. When the operation button 42 is pressed, the oxygen gas generation process for generating the oxygen gas C is started.

The operation panel 41 outputs a power-on signal or a power-off signal indicating that the power of the oxygen concentration device 1 is to be turned on or off in response to the operation button 42 being pressed. A process start-up signal or a process end signal indicating that the oxygen gas generation process which generates the oxygen gas C is to be started or ended is also output.

The oxygen concentration device 1 may have a power button in addition to the operation button 42. The power button may be provided on the back side of the housing of the oxygen concentration device 1 or in a location where it is difficult for the user 2 to operate, such as inside the housing. By providing the power button in a location where it is difficult for the user 2 to operate, erroneous operations such as turning off the power while the oxygen concentration device 1 is executing the oxygen gas generation process which generates the oxygen gas C can be prevented. When the oxygen concentration device 1 has a power button, the operation button 42 becomes a button for the operations of starting or ending the oxygen gas generation process which generates the oxygen gas C.

The up button 44 and the down button 45 for changing the flow rate setting of oxygen gas C are provided on the right side of the operation panel 41. The user can change the set flow rate of the oxygen gas C by operating these two buttons, and the flow rate display of the liquid crystal display unit 43 changes in accordance with the change operation.

When the user is a patient, it is desirable that the set flow rate not be changed to one exceeding the upper limit of oxygen flow rate specified in the prescription by the physician. For example, a patient prescribed to receive oxygen gas supply at 3.00 LPM will not be able to supply oxygen above the set oxygen flow rate of 3.00 LPM. This is to prevent a medical condition called $CO_2$ narcosis which occurs when a user 2 with chronic respiratory failure is administered with a higher concentration of oxygen than prescribed. Thus, an upper limit can be set for the up button 44 so that the up button 44 cannot be operated to set a value exceeding a set flow rate of 3.00 LPM.

FIG. 3(b) is a view showing the state of the operation panel for special operations by medical professionals, etc.

The liquid crystal display unit 43' shown in FIG. 3(b) can be switched to by performing a special operation so that a medical worker or a specialist in the oxygen concentration device 1 can change the upper limit of the set flow rate. The special operation is, for example, an operation of pressing and holding the operation button 42 for 10 seconds or longer, or pressing and holding the up button 44 and the down button 45 at the same time for 5 seconds or longer. Furthermore, a special changeover button may be provided in the housing of the oxygen concentration device 1.

By the special operation, the display of the liquid crystal display unit is changed to the display shown on the liquid crystal display unit 43'. The medical professionals, etc., can change the upper limit of the set flow rate of oxygen using the up button 44 and the down button 45. The value of the flow rate setting upper limit value displayed on the liquid crystal display unit 43' is changed in accordance with the change operation.

The operation unit 40 is connected to the control unit 30. For example, the power on signal, the power off signal, the process start-up signal, and the process end signal corresponding to the pressing of the operation button 42 are transmitted to the operation control unit 328 of the control unit 30. Furthermore, a display signal indicating the set flow rate value is transmitted from the control unit 30 to the liquid crystal display unit 43. Further, the processing of the flow rate setting upper limit value described above is also controlled by the operation control unit 328.

[Start-Up Control Flow]

Figure 4:
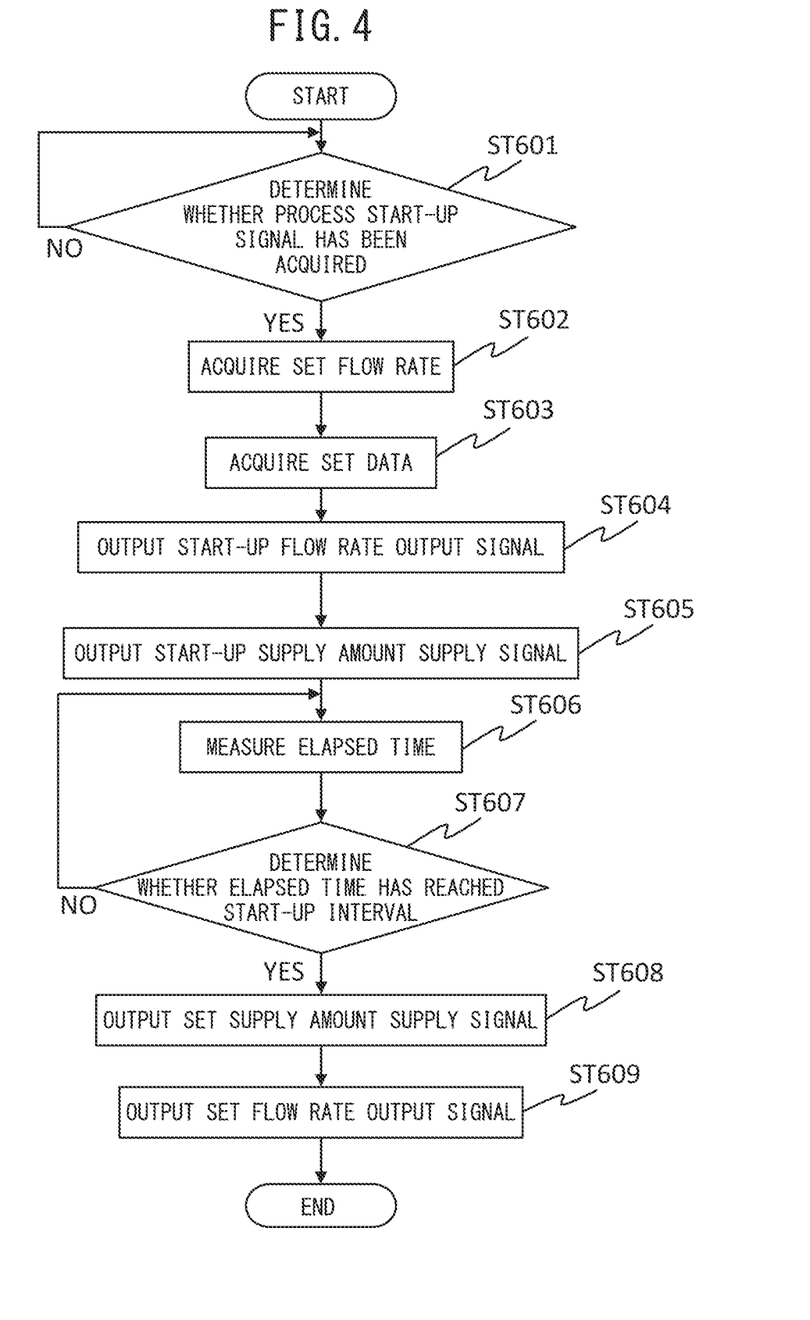
FIG. 4 is a flowchart showing an example of a start-up control process.

FIG. 4 is a flowchart showing an example of start-up control processing executed by the control processing unit 32. The start-up control process shown in FIG. 4 is primarily executed by the control processing unit 32 in cooperation with each element of the oxygen concentration device 1 based on the start control program stored in the control storage unit 31 in advance.

First, the process start-up signal acquisition unit 321 determines whether or not the process start-up signal transmitted by pressing the operation button 42 of the operation panel 41 has been acquired (ST601). The process of ST601 is repeated until it is determined that the process start-up signal has been acquired by the process start-up signal acquisition unit 321 (ST601: YES).

When it is determined by the process start-up signal acquisition unit 321 that the process start-up signal has been acquired (ST601: YES), the set flow rate acquisition unit 322 acquires the set flow rate 311 stored in the control storage unit 31 (ST602).

The set data acquisition unit 323 acquires the set data associated with the set flow rate that matches the set flow rate 311 acquired in the process of ST602 from the set data table 312 stored in the control storage unit 31 (ST603). The set data acquired by the set data acquisition unit 323 includes a start-up supply amount, a start-up flow rate, a set supply amount, and a start-up interval associated with the set flow rate that matches the set flow rate 311.

The flow rate adjustment control unit 325 outputs a start-up flow rate output signal indicating that the start-up flow rate acquired in the process of ST603 is to be output to the flow rate adjustment unit 20 (ST604). The flow rate adjustment unit 20 starts the output of the oxygen gas C at the start-up flow rate acquired in the process of ST603 in response to the input of the start-up flow rate output signal.

The pressurized air supply control unit 324 outputs a start-up supply amount supply signal indicating that the start-up supply amount acquired in the process of ST603 is to be supplied to the pressurized air supply unit 12 (ST605). The pressurized air supply unit 12 starts supplying the pressurized air B at the start-up supply amount acquired in the process of ST603 in response to the input of the start-up supply amount supply signal. Note that the order of ST604 and ST605 may be exchanged.

The timing unit 327 starts measuring the elapsed time after the start-up flow rate output signal is output by the flow rate adjustment control unit 325 or after the operation button is turned on (ST606). It takes a few seconds from the power-on of the oxygen concentration device 1 or the operation button to the start of the elapsed time measurement (ST606). Next, the timing unit 327 determines whether or not the elapsed time since the start-up supply amount supply signal was output or the operation button was turned on has reached the start-up interval acquired by the processing of ST603 (ST607). The timing unit 327 continues to count the elapsed time until it is determined that the elapsed time from the output of the start-up supply amount supply signal has reached the start-up interval and that the start-up interval has elapsed (ST607: YES).

When it is determined by the timing unit 327 that the start-up interval has elapsed (ST607: YES), the pressurized air supply control unit 324 outputs a set supply amount supply signal indicating that the set supply amount acquired in the process of ST603 is to be supplied to the pressurized air supply unit 12 (ST608). The pressurized air supply unit 12 changes the supply amount of the pressurized air B from the start-up supply amount to the set supply amount in response to the input of the set supply amount supply signal.

The flow rate adjustment control unit 325 outputs a set flow rate output signal indicating that the set flow rate acquired in the process of ST603 is to be output to the flow rate adjustment unit 20 (ST609). The flow rate adjustment unit 20 changes the output amount of the oxygen gas C from the start-up flow rate to the set flow rate in response to the input of the set flow rate output signal.

Another Example of Start-Up Control Flow

Though FIG. 4 shows the flow of changing from the start-up supply amount to the set supply amount and from the start-up flow rate to the set flow rate based on the measurement judgment of the start-up interval, this can be changed as long as it is a program for controlling the start-up interval. For example, the output value of the concentration sensor 23 can be monitored from the start of the oxygen concentration device 1 inside the device, and the start-up interval can be changed to end when the oxygen concentration reaches the oxygen concentration at start-up.

Figure 5:
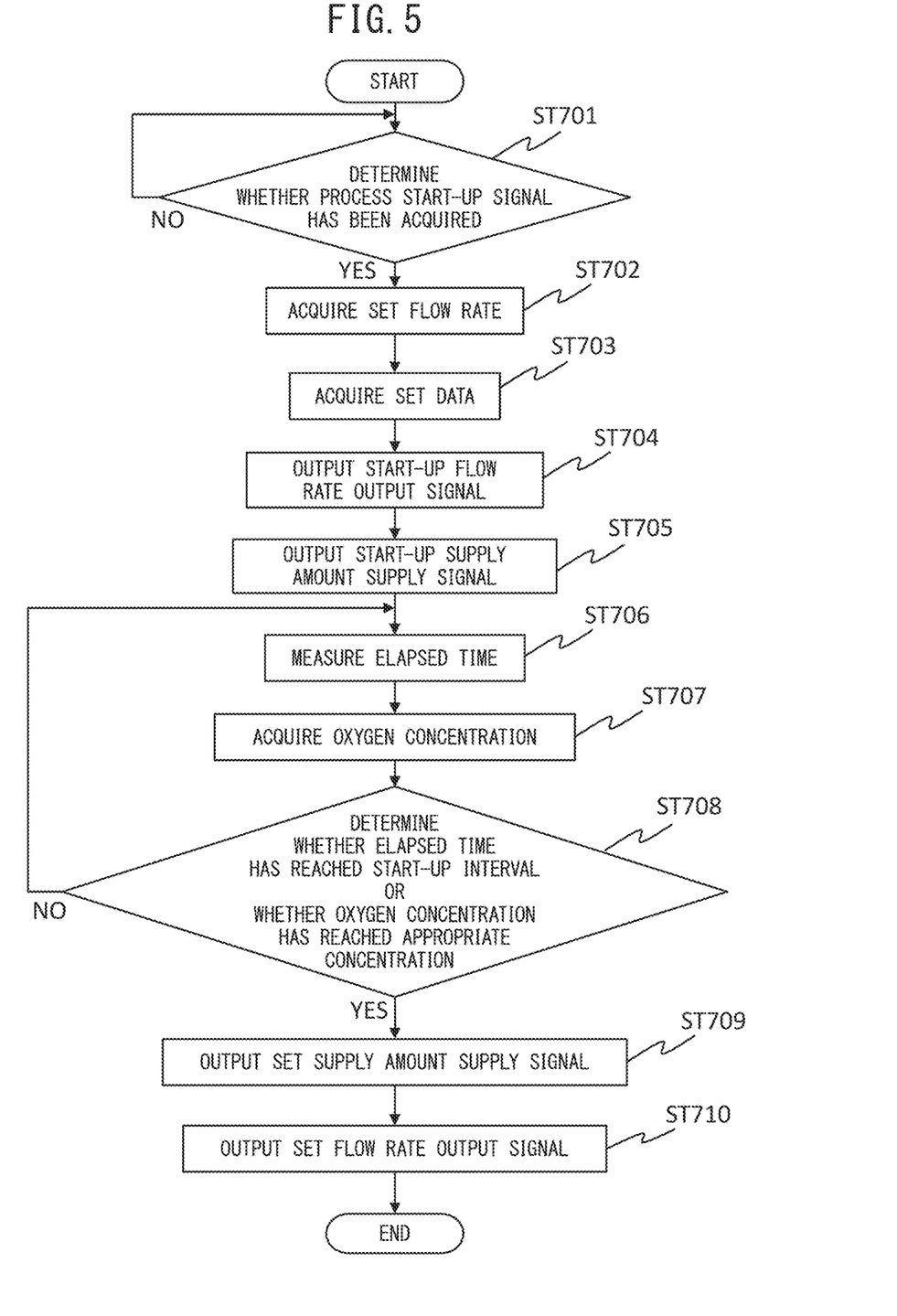
FIG. 5 is a flowchart showing another example of a start-up control process.

FIG. 5 is a flowchart showing another example of start-up control processing executed by the control processing unit 32. The start-up control processing shown in FIG. 5 is executed primarily by the control processing unit 32 in cooperation with each element of the oxygen concentration device 1 based on the start-up control program stored in the control storage unit 31 in advance.

The process start-up signal acquisition unit 321 determines whether or not the process start-up signal transmitted by pressing the operation button 42 of the operation panel 41 has been acquired (ST701). The process of ST701 is repeated until it is determined that the process start-up signal has been acquired by the process start-up signal acquisition unit 321 (ST701: YES).

When it is determined by the process start-up signal acquisition unit 321 that the process start-up signal has been acquired (ST701: YES), the set flow rate acquisition unit 322 acquires the set flow rate 311 stored in the control storage unit 31 (ST702).

The set data acquisition unit 323 acquires the set data associated with the set flow rate that matches the set flow rate 311 acquired in the process of ST702 from the set data table 312 stored in the control storage unit 31 (ST703). The set data acquired by set data acquisition unit 323 includes a start-up supply amount, a start-up flow rate, a set supply amount, a start-up interval, and a start-up oxygen concentration associated with the set flow rate that matches the set flow rate 311.

The flow rate adjustment control unit 325 outputs a start-up flow rate output signal indicating that the start-up flow rate acquired in the process of ST703 is to be output to the flow rate adjustment unit 20 (ST704). The flow rate adjustment unit 20 starts the output of the oxygen gas C at the start-up flow rate acquired in the process of ST703 in response to the input of the start-up flow rate output signal.

The pressurized air supply control unit 324 outputs a start-up supply amount supply signal indicating that the start-up supply amount acquired in the process of ST703 is to be supplied to the pressurized air supply unit 12 (ST705). The pressurized air supply unit 12 starts supplying the pressurized air B at the start-up supply amount acquired in the process of ST703 in response to the input of the start-up supply amount supply signal. Note that the order of ST704 and ST705 may be exchanged.

The timing unit 327 starts measuring the elapsed time after the start-up flow rate output signal is output by the flow rate adjustment control unit 325 or after the operation button is turned on (ST706). It takes a few seconds from the power-on of the oxygen concentration device 1 or the operation button to the start of the elapsed time measurement (ST706).

The end of start-up process determination unit 329 acquires the oxygen concentration from the concentration sensor 23 (ST707). The end of start-up process determination unit 329 determines, whether or not the elapsed time since the start-up supply amount supply signal was output or the operation button was turned on has reached the start-up interval, or whether or not the oxygen concentration has reached a predetermined oxygen concentration (oxygen concentration at start-up) with the concentration sensor 23 (ST708). Note that the determination of ST708 by the end of start-up process determination unit 329 includes that both of conditions (1) and (2), (1) whether or not the elapsed time since the start-up supply amount supply signal was output or the operation button was turned on has reached the start-up interval, and (2) whether or not the oxygen concentration has reached a predetermined oxygen concentration by the concentration sensor 23. Though FIG. 5 shows an example in which both of conditions (1) and (2) are satisfied, as a matter of course, only one of the conditions may be satisfied. Though FIG. 4 shows an example of start-up control processing when only condition (1) is satisfied, start-up control processing may be performed when only condition (2) is satisfied.

When the end of start-up process determination unit 329 determines that the elapsed time since the start-up supply amount supply signal was output or the operation button was turned on has not reached the start-up interval, and the oxygen concentration has not reached the predetermined oxygen concentration by the concentration sensor 23 (ST708: NO), the process returns to ST706. The timing unit 327 continues to measure the elapsed time since the start-up supply amount supply signal was output (ST706).

When the end of start-up process determination unit 329 determines that the elapsed time since the start-up supply amount supply signal was output or the operation button was turned on has reached the start-up interval, or the oxygen concentration has reached the predetermined oxygen concentration (ST708: YES), the pressurized air supply control unit 324 outputs a set supply amount supply signal to the pressurized air supply unit 12 (ST709). The set supply amount supply signal is a signal indicating that the set supply amount acquired in the process of ST703 is to be supplied. The pressurized air supply unit 12 changes the supply amount of the pressurized air B from the start-up supply amount to the set supply amount in response to the input of the set supply amount supply signal.

The flow rate adjustment control unit 325 outputs a set flow rate output signal indicating that the set flow rate acquired in the process of ST703 is to be output to the flow rate adjustment unit 20 (ST710). The flow rate adjustment unit 20 changes the output amount of the oxygen gas C from the start-up flow rate to the set flow rate in response to the input of the set flow rate output signal.

The oxygen concentration device 1 can prevent decreases in oxygen concentration and can realize a fast rise in oxygen concentration even at low flow rate settings.

The mode of operation and effects of the start-up process of the oxygen concentration device 1 will be described in comparison with a conventional start-up process.

Figure 6:
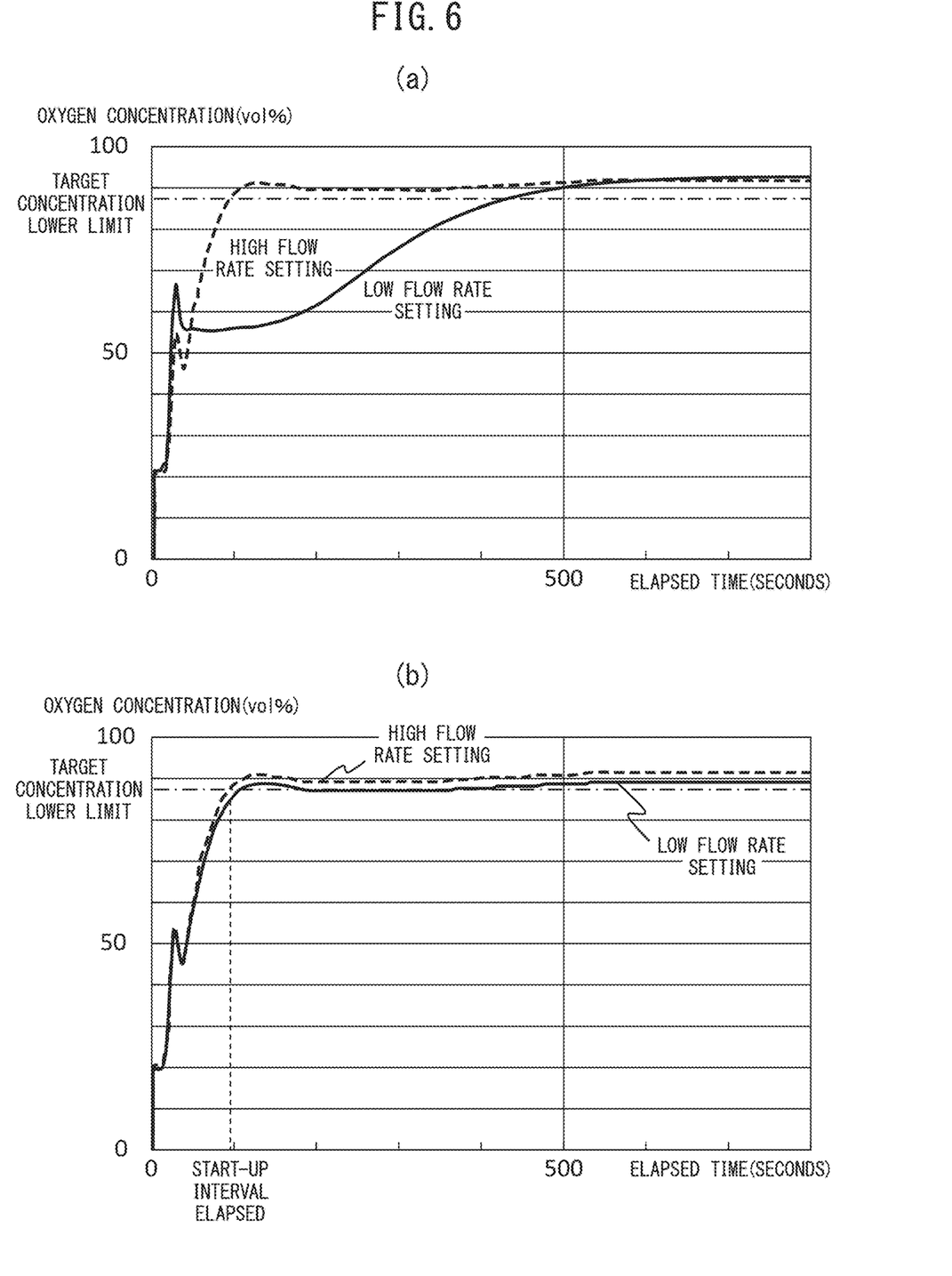
FIG. 6 is a view showing an example of an oxygen concentration transition after start-up of an oxygen concentration device, (a) shows an example of an oxygen concentration transition after start-up of an oxygen concentration device in accordance with a conventional start-up process, and (b) shows an example of an oxygen concentration transition after start-up of an oxygen concentration device according to the start-up process of the present embodiment.

FIG. 6 is a view showing an example of an oxygen concentration transition after start-up of the oxygen concentration device. FIG. 6(*a*) shows an example of an oxygen concentration transition after start-up of the oxygen concentration device by a conventional start-up process, and FIG. 6(*b*) shows an example of an oxygen concentration transition after start-up of the oxygen concentration device according to the start-up process of the present embodiment.

In the conventional start-up process, the supply amount of pressurized air supplied by the pressurized air supply unit 12 is set to correspond to the set flow rate of oxygen gas output from the flow rate adjustment unit 20.

In the present specification, the low flow rate is defined as a range in which the flow rate of oxygen gas is 0.25 LPM to less than 2.00 LPM, and the high flow rate is defined as a range in which the flow rate of oxygen gas is 2.00 LPM to 5.00 LPM.

The horizontal axis of the graph represents the elapsed time (seconds) since the oxygen concentration device 1 was started, and the vertical axis of the graph is oxygen concentration (vol %). The oxygen concentration transition after start-up at the low flow rate (0.25 LPM) setting is represented by the solid line, and the oxygen concentration transition after start-up at the high flow rate (5.00 LPM) setting is represented by the dashed line.

Though the rise of oxygen concentration differs in accordance with the model of oxygen concentration device 1, for example, in the case of a high flow rate setting, the oxygen concentration reaches the lower limit of the concentration target around 100 seconds after start-up. Conversely, in the case of a low flow rate setting, the oxygen concentration gradually increases, and the lower limit of the concentration target is reached after 400 seconds after start-up. Even with a low flow rate setting, a fast rise in oxygen concentration is desired.

In the start-up process of the present embodiment, when the oxygen concentration device 1 is started, the control unit 30 controls the pressurized air supply unit 12 and the flow rate adjustment unit 20 so that the supply amount of the pressurized air and the flow rate of the oxygen corresponding to the maximum set flow rate set in the oxygen concentration device 1 are obtained. This is to increase oxygen concentration in a short time. Thereafter, when a predetermined time from the start (hereinafter referred to as the "start-up interval") has elapsed, the control unit 30 controls the pressurized air supply unit 12 and the flow rate adjustment unit 20 so as to lower both the supply amount of the pressurized air and the set flow rate of the oxygen gas corresponding to the desired set flow rate. It is preferable to control the control unit 30 so that both the supply amount of pressurized air and the set flow rate of the oxygen gas are lowered within 10 seconds. More preferably, they are lowered within 5 seconds.

The control unit 30 starts the oxygen concentration device 1 by setting the supply amount of the pressurized air and the flow rate of oxygen gas corresponding to the maximum set flow rate. If the control is set to lower either the supplied amount of the pressurized air or the flow rate of oxygen gas in a short time after start-up, there is a risk that the oxygen concentration may decrease outside the optimum conditions of the operating conditions (oxygen generation process) of the oxygen concentration device 1.

When only the supply amount of the pressurized air is lowered, the flow rate of oxygen gas remains at the maximum value, whereby the oxygen concentration may decrease due to insufficient raw air and supply pressure.

When only the flow rate of oxygen gas is lowered, the supply amount of the pressurized air remains at the maximum value, whereby there is a risk that the nitrogen components in the adsorption tubes will disappear and argon will be concentrated (oxygen adsorption), resulting in a decrease in oxygen concentration.

FIG. 6(b) is a view showing an example of an oxygen concentration transition after the start-up process of the oxygen concentration device according to the start-up process of the present embodiment. The oxygen concentration transition after start-up at the low flow rate (0.25 LPM) setting is represented by the solid line, and the oxygen concentration transition after start-up at the high flow rate (5.00 LPM) setting is represented by the dashed line. The oxygen concentration transition at the low flow rate is substantially the same as the oxygen concentration transition at the high flow rate. Furthermore, the start-up interval differs in accordance with the model of the oxygen concentration device, and is, for example, less than 120 seconds. By using the control processing of the present embodiment, in the oxygen concentration device 1, decreases in oxygen concentration can be prevented, and a fast rise in oxygen concentration can be achieved even under low concentration settings.

[Check Valve Sticking Prevention Measures]

One of the effects of the control method of the present embodiment is to prevent the check valves from sticking. The valve bodies of the check valves 16 and 17 are formed by molding rubber in order to improve adhesion with the tube openings. The rubber is, for example, silicon rubber or fluororubber. Furthermore, the valve body may be formed of a hard resin and rubber may be attached to the pipe opening sides.

When the oxygen concentration device 1 is stored for a long time in a low temperature environment or is not used for a long time, the zeolite in the adsorption tubes adsorbs gas, the pressure in the adsorption tube drops, and the pressure on the adsorption tube side becomes negative. When a long time elapses, for example, the rubber valve body of the check valve 16 sticks to the tube opening on the adsorption tube 14 side, and the check valve sticks, whereby the opening/closing operation does not occur. When the oxygen concentration device 1 is started with the check valve 16 in a stuck state, if the supply pressure of the pressurized air of the pressurized air supply unit 12 is insufficient relative to the sticking force of the check valve 16, the check valve 16 cannot be released from the stuck state and remains in the closed state. When the oxygen concentration device 1 is started with a low flow rate setting, the supply pressure of the pressurized air is low, whereby there is a risk that the oxygen gas may not flow into the oxygen gas tank 18 or the oxygen flow rate may decrease.

By supplying the maximum amount of pressurized air from the pressurized air supply unit 12 when the oxygen concentration device 1 is started in accordance with the control method of the present embodiment, the pressure of the pressurized air supplied from the pressurized air supply unit 12 is greater than the sticking force of the check valve 16, whereby sticking of the check valve 16 is eliminated.

It is preferable that the supply amount of the pressurized air at the time of starting be the maximum value that can be supplied by the pressurized air supply unit 12, and the flow rate of oxygen gas be the maximum value that can be supplied by the flow rate adjustment unit 20. This is because a faster rise of oxygen concentration can be realized thereby.

The start-up interval is preferably less than 120 seconds. This is to satisfy JIS T7209: 2018 "Medical Electrical Equipment—Individual requirements for basic safety and basic performance of oxygen concentration devices."

In an example, the time to switch the start-up supply amount and start-up flow rate to set supply amount and set flow rate, respectively, was determined only by whether or not the predetermined start-up interval had elapsed. As another example, this may be determined by whether or not the predetermined start-up interval has elapsed, or whether or not a predetermined oxygen concentration has been reached as measured by the concentration sensor 23.

A person skilled in the art would understand that various changes, substitutions and modifications can be made herein without departing from the spirit and scope of the present invention.

REFERENCE SIGNS LIST 1 oxygen concentration device
11 air intake filter
12 pressurized air supply unit
13 switching unit
14, 15 adsorption tube
16, 17 check valve
18 oxygen gas tank
19 pressure control valve
20 flow rate adjustment unit
21 outlet filter
22 humidifier
23 concentration sensor
24 flow rate sensor
30 control unit
31 control storage unit
32 control processing unit
40 operation unit

The invention claimed is:

1. An oxygen concentration device, comprising:
   a compressor for supplying pressurized air,
   an adsorption tube to which the pressurized air is supplied from the compressor and which concentrates oxygen in the pressurized air by adsorbing nitrogen in the supplied pressurized air to generate oxygen gas,
   an oxygen gas tank for storing the oxygen gas generated by the adsorption tube,
   a valve which adjusts an oxygen gas flow rate, which is a flow rate of the oxygen gas to be output to an outside from the oxygen gas tank, and
   a processor which controls the valve so that the oxygen gas flow rate becomes a set flow rate and controls the compressor so that the pressurized air achieves a supply amount corresponding to the set flow rate, wherein
   the processor, only in a start-up interval of the oxygen concentration device, controls the valve so that the oxygen gas flow rate becomes a start-up flow rate which is greater than the set flow rate, and controls the compressor so that the pressurized air achieves a start-up supply amount greater than a set supply amount, the processor is further configured to control the compressor to supply the pressurized air in an amount and at a rate greater than a supply amount corresponding to a maximum set flow rate which is a maximum value at which the processor is configured to set the flow rate, the processor is further configured to set the start-up flow rate to equal to or greater than the maximum set flow rate, wherein the oxygen concentration device further comprises an end of a start-up process determination unit configured to determine an end of a start-up process in accordance with any of whether a predetermined start-up interval has elapsed and whether a predetermined oxygen concentration has been reached, and wherein the processor is further configured to, when a determination of the end of the start-process is made, reduce the start-up supply amount to the set supply amount within 10 seconds from the determination and reduce the start-up flow rate to the set flow rate within 10 seconds from the determination.

2. The oxygen concentration device according to claim 1, wherein the start-up supply amount is a supply amount corresponding to a maximum set flow rate of the compressor, and the start-up flow rate is a maximum set flow rate of the valve.

3. The oxygen concentration device according to claim 1, wherein the start-up supply amount is a maximum supply amount which is supplied by the compressor, and the start-up flow rate is a maximum flow rate which is supplied by the valve.

4. The oxygen concentration device according to claim 1, further comprising a check valve connected between the adsorption tube and the oxygen gas tank.

5. A control method for an oxygen concentration device for controlling so that an oxygen gas flow rate becomes a set flow rate, the method comprising the steps of:

acquiring a process start-up signal indicating that an oxygen gas generation process for generating oxygen gas has started, outputting, to a compressor, a start-up supply amount supply signal indicating that a start-up supply amount greater than a set supply amount, is to be supplied, and outputting, to a valve, a start-up flow rate output signal indicating that a start-up flow rate greater than the set flow rate, is to be output, determining an end of a start-up process in accordance with whether a predetermined start-up interval has elapsed or whether or not a predetermined oxygen concentration has been reached, when the start-up process is determined to have ended, outputting, to the compressor, a set supply amount supply signal indicating that the set supply amount is to be supplied, and outputting, to the valve, a set flow rate output signal indicating that the set flow rate is to be output, controlling the compressor to supply the pressurized air in an amount and at a rate that is greater than a supply amount corresponding to a maximum set flow rate which is a maximum value at which the processor is configured to set the flow rate, setting the start-up flow rate to equal to or greater than the maximum set flow rate, and when a determination is made that the start-up process has ended, outputting, to a pressurized air supply unit, the set supply amount supply signal indicating that the set supply amount is to be supplied, and outputting, by the processor, to a flow rate adjustment unit, the set flow rate output signal indicating that the set flow rate is to be output with the start-up supply amount reduced to the set supply amount within 10 seconds from the determination and with the start-up flow rate reduced to the set flow rate within 10 seconds from the determination.

6. A non-transitory computer readable medium storing a control program for an oxygen concentration device for controlling so that a flow rate of oxygen gas to be output becomes a set flow rate, the control program executing, by means of a processor, processes comprising:

acquiring a process start-up signal indicating that an oxygen gas generation process for generating oxygen gas has started, outputting, to a compressor, a start-up supply amount supply signal indicating that a start-up supply amount greater than a set supply amount, is to be supplied, and outputting, to a valve, a start-up flow rate output signal indicating that a start-up flow rate greater than the set flow rate, is to be output, determining an end of a start-up process in accordance with whether a predetermined start-up interval has elapsed or whether a predetermined oxygen concentration has been reached, when the start-up process is determined to have ended, outputting, to the compressor, a set supply amount supply signal indicating that the set supply amount is to be supplied, and outputting, to the valve, a set flow rate output signal indicating that the set flow rate is to be output, controlling the compressor to supply the pressurized air in an amount and at a rate that is equal to or greater than a supply amount corresponding to a maximum set flow rate which is a maximum value at which the processor is configured to set the flow rate, setting the start-up flow rate to equal to or greater than the maximum set flow rate, and when a determination is made that the start-up process has ended, outputting, to a pressurized air supply unit, the set supply amount supply signal indicating that the set supply amount is to be supplied, and outputting, to a flow rate adjustment unit, the set flow rate output signal indicating that the set flow rate is to be output with the start-up supply amount reduced to the set supply amount within 10 seconds from the determination and with the start-up flow rate reduced to the set flow rate within 10 seconds from the determination.

* * * * *